United States Patent [19]

Lehner et al.

[11] Patent Number: 4,551,359
[45] Date of Patent: Nov. 5, 1985

[54] PRODUCTION OF MAGNETIC RECORDING MEDIA

[75] Inventors: August Lehner, Roedersheim-Gronau; Joachim Hack, Ludwigshafen; Karl Krucker, Frankenthal; Werner Balz, Limburgerhof; Karl H. Roemer, Frankenthal; Peter Rudolf, Fussgoenheim; Roland Falk, Achern; Guenter Eckert, Limburgerhof, all of Fed. Rep. of Germany

[73] Assignee: BASF Aktiengesellschaft, Fed. Rep. of Germany

[21] Appl. No.: 630,181

[22] Filed: Jul. 12, 1984

[30] Foreign Application Priority Data

Jul. 15, 1983 [DE] Fed. Rep. of Germany ....... 3325555

[51] Int. Cl.$^4$ ............................................. H01F 10/02
[52] U.S. Cl. ..................................... 427/130; 427/128
[58] Field of Search ............................... 427/127–132, 427/48

[56] References Cited

U.S. PATENT DOCUMENTS

| | | | |
|---|---|---|---|
| 3,209,054 | 9/1965 | English et al. | 260/861 |
| 3,413,141 | 11/1968 | Friedman | 117/93.2 |
| 3,649,358 | 3/1972 | Johnston II | 117/235 |
| 4,058,646 | 11/1977 | Vaeth et al. | 428/425 |
| 4,234,438 | 11/1980 | Horigome et al. | 252/62.54 |
| 4,320,171 | 3/1982 | Motz et al. | 428/423.1 |

*Primary Examiner*—Bernard D. Pianalto
*Attorney, Agent, or Firm*—Keil & Weinkauf

[57] ABSTRACT

Magnetic recording media possessing a thin magnetic layer are produced by dispersing finely divided magnetically anisotropic material and conventional additives in a solution of a polymeric binder in an organic solvent, applying a layer of the dispersion to a non-magnetizable base by means of a knife-coater, then, if required, orienting the magnetically anisotropic material by means of a magnetic field and drying the applied layer, a high molecular weight organic compound which acts as a thickener being added to the magnetic dispersion.

2 Claims, No Drawings

PRODUCTION OF MAGNETIC RECORDING MEDIA

The present invention relates to a process for the production of magnetic recording media possessing a thin magnetic layer by dispersing finely divided, magnetically anisotropic material and conventional additives in a solution of a polymeric binder in an organic solvent, applying a layer of the dispersion to a non-magnetizable base by means of a knife-coater, then, if required, orienting the magnetically anisotropic material by means of a magnetic field, and drying the applied layer.

It is known that magnetic recording media can be produced by coating a non-magnetizable base with a dispersion of a magnetic material in a solution of a polymer binder and then solidifying the layer. Coating of the base material, which is usually in the form of a continuous web, is carried out in a conventional manner by means of a knife-coater or the reverse roll coating method. The thickness of the coating depends on the desired thickness of the magnetic layer, taking into account the shrinkage of the applied layer of magnetic dispersion on drying (shrinkage factor).

The trend towards higher recording densities in the case of magnetic recording media, in particular media, makes it necessary to provide very thin magnetic layers which nevertheless have good magnetic characteristics which remain substantially unchanged over the entire length of the tape. This means that the magnetic layer must be very uniformly distributed, i.e. must not vary in thickness. The resulting magnetic layer must furthermore exhibit good adhesion to the base and has to be very resistant to solvents, variations in temperature, moisture and abrasion. This means that the layer has to be hard but not brittle.

The binders used in the production of the layer therefore play a substantial role in determining its mechanical properties.

A large number of polymers and mixtures of various polymers have been proposed as binders for the finely divided magnetic material. For example, it is known that polyacrylates, nylons, cellulose nitrates, polyesters, polyurethanes, phenoxy resins, vinyl chloride/acrylonitrile copolymers and vinyl chloride/vinyl acetate/vinyl alcohol copolymers can be used. The majority of the stated polymers are relatively hard and brittle. However, the mechanical stress to which the magnetic layer is usually subjected necessitates a flexible formulation. Frequently, therefore, polyurethane elastomers are combined with relatively brittle polymers, such as phenoxy resins, vinyl chloride/vinyl acetate copolymers, polycarbonates, etc., or plasticizers are introduced into the layer.

However, we have found that magnetic layers which are very thin, in particular about 1 $\mu$m thick, and which are homogeneous and exhibit only small variations in thickness cannot be produced with the known, usually used binders. This is particularly so when the dispersion is applied to the base by means of a knife-coater. Because the dry layer is extremely thin, the magnetic dispersion has to be applied in a very thin layer, taking into account the usual skrinkage of the solvent-containing layer on drying. The application of a very thin layer necessitates a very small gap between the knife and the base material, which readily results in wetting problems and the formation of casting lines.

On the other hand, increasing the shrinkage factor by diluting the magnetic dispersion with a solvent has the disadvantage that the viscosity decreases markedly, and hence the operation of applying the dispersion to the base can no longer be controlled. Furthermore, the presence of too large an amount of solvent generally makes the dispersion unstable.

It is an object of the present invention to provide a process by means of which magnetic recording media possessing a particularly thin magnetic layer can be produced, without the above disadvantages, by applying a dispersion of finely divided magnetic material in a solution of a polymeric binder to a base with the aid of a knife-coater. In spite of being thin, the magnetic layer must furthermore be extremely homogeneous as well as mechanically stable. The magnetic properties of these very thin layers must also satisfy modern recording requirements.

We have found that this object is achieved, and that magnetic recording media possessing a thin magnetic layer can be produced, in accordance with the invention, if from 3 to 30% by weight, based on the amount of polymeric binder, of a high molecular weight organic compound which causes the dispersion to exhibit elastico-viscous to thixotropic flow behavior is added to the dispersion, which is applied to the base by means of a knife-coater.

Particularly suitable high molecular weight organic compounds are nitrocellulose having a K value greater than 75, in particular greater than 90, preferably from 100 to 200, and high molecular weight reaction products, such as cellulose acetobutyrates, cellulose acetates and cellulose propionates, which achieve a K value greater than 75, in particular greater than 90, preferably from 100 to 200, as a result of reaction with a diisocyanate or polyisocyanate. In the reaction with the diisocyanates and/or polyisocyanates, the molecule is enlarged by crosslinking via the OH groups of the cellulose molecules.

The high molecular weight organic compounds added to the dispersion in the novel process are used in the stated amount, preferably in an amount of from 5 to 20% by weight, based on the amount of polymeric binder in the dispersion.

The composition and the method of preparation of the dispersion of the magnetic materials in the polymeric binder are conventional.

Suitable magnetic materials are the conventional ones, such as gamma-iron(III) oxide, finely divided magnetite, doped or undoped ferromagnetic chromium dioxide, cobalt-doped gamma-iron(III) oxide and ferromagnetic metal and metal alloy powders, predominantly consisting of iron and cobalt. Preferred materials are acicular gamma-iron(III) oxide and ferromagnetic chromium dioxide. The particle length is in general from 0.2 to 2 $\mu$m, preferably from 0.3 to 0.8 $\mu$m.

The binders, too, are selected from those conventionally used for the production of magnetic recording media. These include nylon copolymers which are soluble in the usual solvents, polyvinylformals, polyurethane elastomers, mixtures of polyisocyanates and relatively high molecular weight polyhydroxy compounds or vinyl chloride polymers containing more than 60% of vinyl chloride units, for example a vinyl chloride copolymer with one or more comonomers, such as a vinyl ester of a monocarboxylic acid of 2 to 9 carbon atoms, or an ester of an aliphatic alcohol of 1 to 9 carbon atoms and an ethylenically unsaturated carboxylic acid of 3 to 5 carbon atoms, eg. the esters of acrylic acid, methacrylic acid or maleic acid, or a copolymer of vinyl chloride with one or more of these carboxylic acids themselves as comonomers, or hydroxyl-containing vinyl chloride copolymers which can be prepared by partial hydrolysis of vinyl chloride/vinyl ester copolymers or direct copolymerization of vinyl chloride with hydroxyl-containing monomers, such as allyl alcohol, 4-hydroxybutyl acrylate or methacrylate or 2-hydroxyethyl acrylate or methacrylate. Other suitable binders are mixtures of one or more polyurethane elastomers with polyvinylformals, phenoxy resins and vinyl chloride copolymers of the above composition. Preferred binders are polyurethane elastomers having a K value (1% strength in dimethylformamide) as high as 75, as described in, inter alia, German Published Application Nos. DAS 1,106,955 and DAS 2,753,694 and German Laid-Open Application No. DOS 2,442,762, as well as polyvinylformal binders which are prepared in a conventional manner by hydrolysis of a polymer of a vinyl ester, followed by reaction of the vinyl alcohol polymer with formaldehyde. Advantageously, they contain not less than 65, in particular not less than 80,% by weight of vinylformal groups. Very suitable polyvinylformals contain from 5 to 13% by weight of vinyl alcohol groups, from 7 to 15% by weight of vinyl acetate groups and from 80 to 88% by weight of vinylformal groups and have a specific gravity of about 1.2 and a K value (1% strength in dimethylformamide) of 60±5. Mixtures, in particular mixtures of the two last-mentioned binders, are also very useful.

Solvents which are preferably used for the preparation and processing of the polymers are cyclic ethers, such as tetrahydrofuran and dioxane, and ketones, such as methyl ethyl ketone and cyclohexanone. The polyurethanes can of course also be dissolved in other highly polar solvents, such as dimethylformamide, pyrrolidone, dimethyl sulfoxide or ethylene glycol acetate. It is also possible to mix the said solvents with aromatics, such as toluene or xylene, or esters, such as ethyl acetate or butyl acetate.

The magnetic layers can furthermore contain small amounts of conventional additives, such as dispersants and/or lubricants, as well as fillers, these being admixed during the dispersing of the magnetic materials or during the production of the magnetic layer. Examples of such additives are fatty acids or isomerized fatty acids, such as stearic acid, or their salts with metals of main groups I to IV of the periodic table of elements, amphoteric electrolytes, such as lecithin, and fatty acid esters or waxes, silicone oils, conductive carbon, etc. The additives are used in the usual amount, this being in general less than 10 percent by weight, based on the magnetic layer.

Suitable non-magnetic and non-magnetizable bases are the conventional bases, in particular films made of linear polyesters, such as polyethylene terephthalate, in general from 4 to 200, in particular from 7 to 36, $\mu$m thick. Paperboard bases, which are employed in magnetic cards for electronic computing and accounting machines, can also be used.

The magnetic recording media are produced in a conventional manner. Advantageously, the magnetic dispersion is prepared in a dispersing apparatus, eg. a tubular ball mill or a stirred ball mill, from the magnetic material and a solution of the binder or binders, with the addition of dispersants and other additives, the dispersion is filtered and then applied to the non-magnetic base by means of a knife-coater, and the applied layer is dried. When carrying out dispersing, it is advantageous if the magnetic material is dispersed beforehand with some of the binder and some of the solvent and with the dispersants, and the resulting dispersion then made up with the rest of the binder and the high molecular weight organic compound.

The thermoplasticity of the novel magnetic layers can be reduced and their abrasion resistance can be further improved if a polyisocyanate, preferably a diisocyanate or triisocyanate, such as 4,4'-diisocyanatodiphenylmethane or a triisocyanate obtained from 3 moles of a diisocyanate, such as toluylene diisocyanate or 4,4'-diisocyanatodiphenylmethane, and 1 mole of a triol, such as glycerol or 1,1,1-trimethylolpropane, in particular a reaction product obtained from 3 moles of toluylene diisocyanate and 1 mole of 1,1,1-trimethylolpropane, is added to the finished magnetic dispersion, preferably just before it is applied to the base. The amount of polyisocyanates added for this purpose is in general about 1–25 percent by weight, based on the total amount of binder.

If binders or binder mixtures are used to which reactive polyisocyanates have been added before or during application of the magnetic dispersion to the base, heating the magnetic layer can improve durability. The crosslinking reaction is advantageously accelerated by adding catalysts, for example by adding tertiary amines, such as triethylamine, triethylenediamine, N-methylpyridine or N-methylmorpholine, metal salts, such as potassium acetate or zinc stearate, or organic metal compounds, such as dibutyltin dilaurate. The coated films are then calendered on conventional machines having polished rollers optionally heated to from 50° to 100° C., preferably from 60° to 80° C. The magnetic layer is less than 3.5, preferably from 0.7 to 1.5 $\mu$m thick. For the production of flexible magnetic tapes, the coated films are slit, in the longitudinal direction, to the usual widths. Flexible disks are punched out of the webs.

The novel process permits the production of thin homogeneous magnetic layers which are about 1 $\mu$m thick but nevertheless exhibit only small variations in thickness. We have found that dispersions having a viscosity of from 50 to 400, preferably from 80 to 200, mPa.s and a yield value of from 5 to 40, preferably from 8 to 25, Pa, are particularly useful, the oxide/solvent ratio in this case being not less than 1:4.5. Very advantageous oxide/solvent ratios are those which are greater than 1:5.5 or even 1:6.5, up to an upper limit of 1:10. In the conventional production of magnetic layers by coating the flexible base by means of a knife-coater, a shrinkage factor, ie. the ratio of the gap between the knife and the base material (hereinafter referred to as "casting gap") to the thickness of the dry magnetic layer, of less than 10 is possible, such a shrinkage factor being adequate for the production of conventional recording media. By contrast, with the novel process, a shrinkage factor greater than 10, preferably from 15 to 25, can be obtained. However, this is dependent on the magnetic dispersion exhibiting pronounced elastico-viscosity. Because of this thixotropic flow behavior, the dispersion can be easily processed under shear stress, as occurs directly during coating, and then, after it has been applied to the base, rapidly achieves a high viscosity. Consequently, the dispersion also exhibits very good flow in the coating apparatus and hence gives a very homogeneous layer, this homogeneity being maintained after the viscosity has increased.

The dispersions produced according to the invention are therefore stable and easy to filter, in spite of the fact that they contain a large amount of solvent. They can be readily processed without the formation of casting lines.

Compared with magnetic recording media produced in a conventional manner without the said high molecular weight organic compounds, the magnetic recording media produced by the novel process have a magnetic layer exhibiting improved homogeneity in spite of the fact that the layer is very thin. Because of this magnetic layer, which is both uniform in thickness and homogeneous, these magnetic recording media exhibit substantially fewer dropouts and drop-ins due to casting lines and have advantageous peak-shift characteristics. The surface of the magnetic coating is also very smooth and this has the advantage that modulation is low.

The Examples which follow illustrate the invention; the Comparative Experiment illustrates the state of the art. In the Examples and Comparative Experiment, parts and percentages are by weight, unless stated otherwise.

EXAMPLE A

In a stirred flask, 85 parts of a cellulose acetobutyrate containing 37% of butyrate groups, 13% of acetate groups and 2% of hydroxyl groups and having a K value of 60 (measured on a 1% strength solution in dimethylformamide) were dissolved in 1,050 parts of anhydrous tetrahydrofuran at 55° C., and 3.75 parts of diphenylmethane diisocyanate and 0.9 part of dibutyltin dilaurate were added to the stirred solution. After 5 hours, free NCO was no longer detectable. This solution, referred to as component A, had a viscosity of 420 mPa.s (measured at 23° C.) and a K value of 91.

EXAMPLE 1

In a stirred kettle having a capacity of 60 parts by volume, a solution of 28 parts of a polyurethane elastomer which had a mean molecular weight of 100,000 and a K value of 65 and was based on a polyester diol (obtained from adipic acid and butane-1,4-diol) having a molecular weight of 1,000, butane-1,4-diol, trimethylolpropane and diphenylmethane diisocyanate, and 7 parts of a phenoxy resin based on bisphenol A and epichlorohydrin and containing 6% of secondary hydroxyl groups, in 211.5 parts of tetrahydrofuran and 453.5 parts of dioxane, was mixed with 6.5 parts of conductive carbon, 4 parts of an $\alpha$-$Fe_2O_3$ having a mean particle size of 0.3 $\mu$m and 108.5 parts of an acicular gamma-iron(III) oxide having a coercive force of 50 kA/m and a mean particle length of 0.5 $\mu$m. This mixture was then dispersed in a stirred ball mill, 8 parts of component A were added, and dispersion was effected again.

16 parts of a polyisocyanate, obtained from three moles of toluylene diisocyanate and one mole of trimethylolpropane, were then added to this dispersion, and the resulting dispersion was then immediately used for coating.

The dispersion prepared in this manner had a viscosity of 100 mPa.s and a yield value of 12 Pa.

The dispersion was then applied to a 12 $\mu$m thick polyethylene terephthalate film by means of a knife-coater to give a layer 15 $\mu$m thick. After drying, the layer thickness was 1.0 $\mu$m, the shrinkage factor therefore being 15.

COMPARATIVE EXPERIMENT

Using a procedure similar to that described in Example 1, a ready-to-use dispersion was prepared from 52 parts of a polyurethane elastomer having a composition similar to that of Example 1 and a K value of 70, 13 parts of the phenoxy resin described in Example 1, 195 parts of tetrahydrofuran, 456 parts of dioxane, 10 parts of conductive carbon, 6 parts of $\alpha$-$Fe_2O_3$ and 164.5 parts of the gamma-iron(III) oxide also used in Example 1, 23 parts of the same polyisocyanate being added subsequently. The viscosity was 120 mPa.s and the yield value was 12 Pa.

Although the rheological properties were similar to those of the dispersion described in Example 1, the casting gap had to be kept at only 10 $\mu$m in order to obtain a 1.3 $\mu$m thick magnetic layer (shrinkage factor 7.7). Furthermore, it was impossible to obtain a magnetic layer free of casting lines.

EXAMPLE 2

The procedure described in Example 1 was followed, except that, instead of component A, the same amount of a nitrocellulose having a K value of 110 was used. The ready-to-use dispersion had a viscosity of 110 mPa.s and a yield value of 13 Pa. In order to obtain a homogeneous 1.0 $\mu$m thick magnetic layer, it was only necessary to use a casting gap of 17 $\mu$m. The shrinkage factor is thus 17.

EXAMPLE 3

The procedure described in Example 2 was followed, except that a nitrocellulose having a K value of 90 was used. Homogeneous 10 $\mu$m thick layers were produced, the shrinkage factor being 15.

EXAMPLE 4

The procedure described in Example 2 was followed, except that a nitrocellulose having a K value of 120 was used. Satisfactory 1.0 $\mu$m thick layers were produced, the shrinkage factor being 20.

We claim:
1. In a process for the production of a magnetic recording medium having a thin magnetic layer by dispersing finely divided, magnetically anisotropic material and conventional additives in a solution of a polymeric binder in an organic solvent, applying a layer of the dispersion to a non-magnetizable base by means of a knife-coater, and drying the applied layer, the improvement which comprises: adding to the dispersion to be applied to the base from 3 to 30% by weight, based on the amount of polymeric binder, of a high molecular weight organic compound based on a cellulose reaction product having a K value of more than 75, whereby the dispersion has a viscosity of from 50 to 400 mPa.s measured at 23° C. and an oxide/solvent ratio of from 1:4.5 to 1:10.

2. The process of claim 1, wherein the high molecular weight organic compound is formed by reacting a cellulose reaction product with a diisocyanate or polyisocyanate.

* * * * *